United States Patent [19]

Kawamoto

[11] Patent Number: 5,241,390

[45] Date of Patent: Aug. 31, 1993

[54] DIGITAL SOFT WIPE SIGNAL GENERATING APPARATUS

[75] Inventor: Sigeharu Kawamoto, Yokohama, Japan

[73] Assignee: Matsushita Electric Industrial Co., Ltd., Osaka, Japan

[21] Appl. No.: 714,865

[22] Filed: Jun. 13, 1991

[30] Foreign Application Priority Data

Jun. 21, 1991 [JP] Japan .................. 2-163323

[51] Int. Cl.[5] .................................. H04N 5/262
[52] U.S. Cl. ................................ 358/183; 358/182
[58] Field of Search .................. 358/183, 22, 182

[56] References Cited

U.S. PATENT DOCUMENTS

| | | | |
|---|---|---|---|
| 3,821,468 | 6/1974 | Busch | 358/183 |
| 4,698,666 | 10/1987 | Lake, Jr. et al. | 358/22 |
| 5,008,755 | 4/1991 | Brain | 358/183 |
| 5,058,189 | 10/1991 | Kanno | 358/183 |

FOREIGN PATENT DOCUMENTS 0044862  3/1983  Japan .................. 358/183

Primary Examiner—Victor R. Kostak
Attorney, Agent, or Firm—Stevens, Davis, Miller & Mosher

[57] ABSTRACT

In a device for producing a composite video picture display by combining digital video signals, a soft wipe signal is produced with an inclination from an input wipe signal, delayed pulses are produced by delay circuits for vertical-wise delays in the picture display and by shift registers for horizontalwise delays in the picture, and digital values of these pulses are normalized by an adder and a multiplier to produce the soft wipe signal.

1 Claim, 2 Drawing Sheets

123
DIGITAL SOFT WIPE SIGNAL GENERATING APPARATUS

CROSS-REFERENCE TO RELATED APPLICATION

This application relates to U.S. Ser. No. 714,842 entitled "Digital Mixer Circuit" filed Jun. 13, 1991 by Sigeharu Kawamoto and U.S. Ser. No. 714,842 entitled "Digital Wipe Pattern Generating Device" filed Jun. 13, 1991 by Sigeharu Kawamoto, and assigned to the present assignee, based on Japanese Application No. 2-163322 filed Jun. 21, 1990 and No. 2-163324 filed Jun. 21, 1990, and the contents of which are incorporated herein by reference.

BACKGROUND OF THE INVENTION

The present invention relates to a digital soft wipe signal generating apparatus used in broadcasting appliances and the like.

In general, a soft wipe signal is produced as an analog form.

FIG. 1 is a schematic block diagram for showing an arrangement of a conventional soft wipe signal generating apparatus.

In FIG. 1, reference numeral 1 indicates an analog specific waveform generator for generating a signal 1a having a specific waveform such as a triangle waveform and a sawtooth waveform from either a horizontal synchronization (sync) signal, or a vertical sync signal. Reference numeral 2 indicates an amplifier for amplifying the signal 1a generated by this analog specific waveform generator 1 by a predetermined variable resistor.

Reference numeral 3 denotes a limiter for limiting upper and lower levels of the signal 1a amplified by the amplifier 2; reference numeral 4 represents a multiplier for synthesizing a picture signal "A" and a picture signal "B" based on an output signal 3a limited by the limiter 3, whereby a synthesized signal 4a is outputted therefrom.

Now, operation of the above-described prior art will be explained. The signal 1a obtained by the analog specific waveform generator 1 is of an analog type waveform, which produces a triangle waveform, a sawtooth waveform and a parabolic waveform.

The signal 1a generated by this analog specific waveform generator 1 is amplified to a predetermined level by the amplifier 2, and subsequently inputted into the limiter 3. This limiter 3 limits the upper and lower levels of the output signal from the amplifier 2 so that an output signal 3a produced by increasing the inclinations of the signal 1a is outputted.

The synthesized signal 4a between the picture signal A and the picture signal B is outputted from the multiplier 4 in such a manner that in response to this output signal, a ratio of synthesization between the picture signal A and the picture signal B is varied, and the inclination is established in the boundary between the picture signal A and the picture signal B, whereby the soft wipe signal may be produced.

However, in the above-described soft wipe signal generating apparatus, the soft wipe signal is produced by way of the analog method, both the amplification adjustment in the amplifier 2 is required and the limit level adjustment in the limiter 3 is also required. Furthermore, there is another problem that since capacitors and the like are employed in the analog specific waveform generator 1, this soft wipe signal generating apparatus is difficult to be manufactured in an integrated circuit.

SUMMARY OF THE INVENTION

The present invention has been made in an attempt to solve such problems, and therefore has an object to provide a digital soft wipe signal generating apparatus which can be formed in an integrated circuit by performing the digital process, and thus can be made compact with having multi-function without cumbersome adjustments.

To achieve the above-mentioned object, the digital soft wipe signal generating apparatus according to the present invention is characterized by comprising:

delay means for delaying a digitally-produced original wipe pattern by plural pieces in both a horizontal direction and a vertical direction of a screen;

an adder for adding a pulse group outputted from said delay means; and a multiplier for multiplying an addition result of said adder by a predetermined coefficient.

DESCRIPTION OF THE PREFERRED EMBODIMENT

Figure 1:
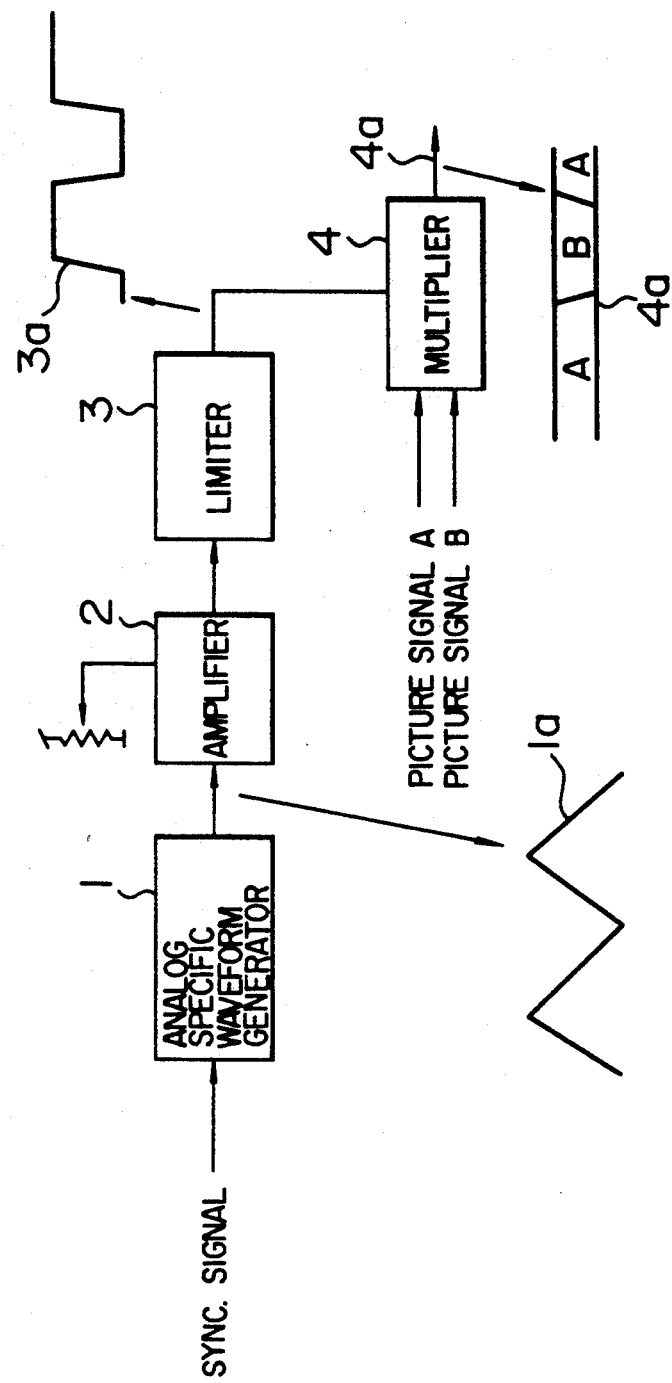
FIG. 1 is a schematic block diagram of a conventional soft wipe signal generating apparatus; and, FIG. 2 is a schematic block diagram of a digital soft wipe signal generating apparatus according to an embodiment of the present invention.
Figure 2:
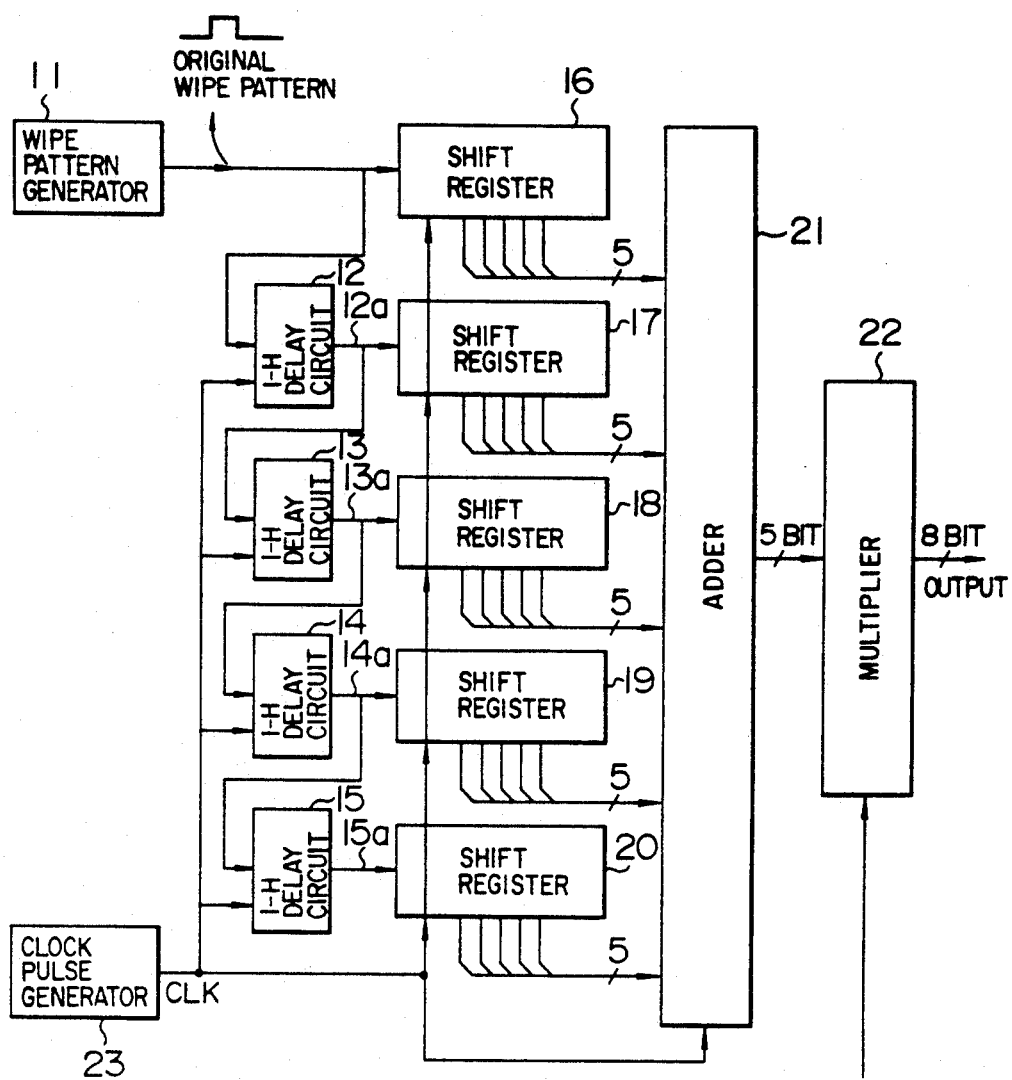

FIG. 2 represents an arrangement of an embodiment of the present invention. In FIG. 2, reference numeral 11 indicates a wipe pattern generator for generating an original wipe pattern in a digital form. A digital wipe pattern generating apparatus as described in, for instance, Japanese Patent Application No. 2-163324 (U.S. patent application Ser. No. 714,922, filed Jun. 13, 1991 is used as this wipe pattern generator 11. The original wipe pattern is, for example, a 1-bit signal having 5 $V_{p-p}$. Reference numerals 12 to 15 denote delay circuits for delaying the original wipe pattern 11 by 1 horizontal scanning time per 10 clocks in a vertical direction in response to clocks from a clock pulse generator 23. Line memories are employed as these delay circuits 12 to 15.

Reference numeral 16 indicates a shift register for delaying the above-described original wipe pattern in a horizontal direction by 5 bits per 1 clock, and reference numerals 17 to 20 represent shift registers for delaying the outputs 12a to 15a from the respective delay circuits 12 to 15 by 5 bits per 1 clock. Accordingly, 5 pieces of 1-bit data are outputted from each of these shift registers 16 to 20, whereby 25 pieces of 1-bit data in total are produced therefrom.

Then, a delay means for delaying the original wipe pattern along both of the horizontal direction and the vertical direction of the screen is arranged by the above-described delay circuits 12 to 15 and shift registers 16 to 20.

Also, reference numeral 21 denotes an adder for binary-representing 0 to 25 pieces of 5-bit data by counting high levels of the 1-bit data outputted from the shift registers 16 to 20 every 1 clock. Reference numeral 22 indicates a multiplier for multiplying 5-bit data outputted from the adder 21 by a coefficient of "10.2" in order that a multiplication result for 25 is equal to 255 (FF in hexadecimal) so as to normalize the 5-bit data as 8-bit data. Reference numeral 4A denotes a multiplier for combining or synthesizing video signal A and video signal B to output a composite signal 4a.

Operation of the above-described embodiment will now be described.

The original wipe pattern outputted from the wipe pattern generator 11 is delayed in the vertical direction by 1 horizontal scanning time (hereinafter referred to as a "1H") per 910 clocks in the delay circuit 12, and furthermore delayed by 1H per 910 clocks in the delay circuit 13, and also delayed by 1H per 910 clocks in the delay circuit 14, and further delayed by 1H per 910 clocks in the delay circuit 15 along the vertical direction.

Thus, the pulses obtained from these delay circuits 12 to 15 are further delayed in the horizontal direction every 1 clock by the respective shift registers 16 to 20. In these shift registers 16 to 20, since these pulses are shifted by 5 bits at maximum, 25 pieces of pulse in total are obtained.

Next, in the adder 21, an adder operation is carried out in such a manner that the number of high levels in 25 pieces of 1-bit data every 5 bits from the shift registers 16 to 20 is counted per one clock, and a weight operation is performed. As a result, the output from the adder 21 is such that "0" to "25" data are binary-expressed by 5 bits.

Subsequently, the output from the adder 21 is outputted to the multiplier 22. In this multiplier 22, the multiplication is performed in such a manner that "25" input data become "255" (FF in hexadecimal) so as to normalize the 5-bit data as 8-bit data. In other words, the multiplication is performed with the coefficient of 10.2.

As a consequence, a soft wipe pattern may be represented by 8 bits by graduating the original wipe pattern in the horizontal direction and vertical direction.

It should be noted that although both the delay amount in the horizontal direction and the delay amount in the vertical direction are performed by 5 pieces, respectively, in this embodiment, these delay amounts may be varied depending upon a desirable soft wipe width. In this case, if the coefficient of the multiplier 22 for the normalization is changed, the delay amounts may be varied.

Also, the number of high level is counted by the adder 21 in this embodiment. Alternatively, if the coefficient of the multiplier 22 while performing the normalization is changed, the similar effect may be achieved by counting the number of low level.

As is apparent from the above-described embodiments, since the present invention is arranged by employing the delay means for delaying the digitally produced original wipe pattern by plural numbers in the horizontal and vertical directions of the screen, respectively, the adder for adding the pulse group outputted from the delay means so as to be weighted, and the multiplier for multiplying the adding result from this adder by a predetermined coefficient so as to be normalized, the digital process is carried out and the entire circuit may be readily manufactured in an integrated circuit. As a result, the overall digital soft wipe signal generating apparatus may be made compact while having multifunction without cumbersome adjustments.

What is claimed is:

1. A digital soft wipe signal generating apparatus comprising:
   means for generating a wipe pattern in a digital signal;
   a first delay circuit for delaying said wipe pattern by 1 horizontal scanning period when a predetermined number of clock signals is counted;
   a second delay circuit for delaying an output from said first delay circuit when a predetermined number of clock signals is counted;
   an n-th delay circuit for delaying an output from an (n−1)-th delay circuit when a predetermined number of clock signals is counted;
   a first shift register for shifting said wipe pattern by 1 bit in the horizontal scanning direction in response to the clock signal;
   second to n-th shift registers for shifting each of the outputs from said second to n-th delay circuits in response to the clock signal;
   an adder for adding outputs from said first to n-th shift registers with each other; and
   a multiplier for multiplying an output from said adder by a predetermined coefficient to provide soft-wipe control data.

* * * * *